United States Patent [11] 3,610,896

[72] Inventor Joseph P. Heid
Wynnewood, Pa.
[21] Appl. No. 826,160
[22] Filed May 20, 1969
[45] Patented Oct. 5, 1971
[73] Assignee Advanced Associates, Inc.
Bridgeport, Pa.

[54] SYSTEM FOR COMPUTING IN THE HYBRID DOMAIN
11 Claims, 12 Drawing Figs.

[52] U.S. Cl. 235/150.5, 340/347, 340/172.5, 235/150.53
[51] Int. Cl. G06j 1/00, G06g 7/26
[50] Field of Search 235/150.5, 150.51, 150.52, 150.53, 150.4, 150.3; 340/347 DA, 347 AD; 235/186

[56] References Cited
UNITED STATES PATENTS

| | | | |
|---|---|---|---|
| 3,146,343 | 8/1964 | Young | 235/150.5 |
| 3,453,421 | 7/1969 | Tonnesson | 235/150.5 X |
| 3,470,362 | 9/1969 | Miller | 235/150.5 X |
| 3,475,598 | 10/1969 | Gilbert | 235/150.5 |

*Primary Examiner*—Malcolm A. Morrison
*Assistant Examiner*—Joseph F. Ruggiero
*Attorney*—Paul & Paul

ABSTRACT: A programmable, sequential-step electronic computing system is disclosed which utilizes, for its basic mathematical capability, a hybrid computing element having an operational amplifier, comparator amplifier, summing resistor network, current-switching network and digital register, being interconnected by control circuitry to provide a plurality of mathematical operations. An input multiplexor and output distributor provide the hybrid computing element with capability to interface with analog and digital systems. Programmed memory and logic circuitry effect sequential step-by-step operation of the hybrid computing element upon the multiplexed signals, providing the program flexiblity of a digital system.

INVENTOR.
JOSEPH P. HEID
BY Paul & Paul
ATTORNEYS

INVENTOR.
JOSEPH P. HEID
BY Paul & Paul
ATTORNEYS.

INVENTOR
JOSEPH P. HEID
BY Paul & Paul
ATTORNEYS.

INVENTOR.
JOSEPH P. HEID
BY Paul & Paul
ATTORNEYS.

INVENTOR.
JOSEPH P. HEID
BY Paul & Paul
ATTORNEYS.

INVENTOR.
JOSEPH P. HEID
BY Paul & Paul
ATTORNEYS.

INVENTOR.
JOSEPH P. HEID
BY Paul & Paul
ATTORNEYS.

SYSTEM FOR COMPUTING IN THE HYBRID DOMAIN

BACKGROUND OF THE INVENTION

A. Field of the Invention

This invention relates to hybrid computers, and more particularly to programmable sequential operation hybrid computers.

B. Description of the Prior Art

Hybrid converters which accomplish analog to digital conversion and digital to analog conversion are known to the art, and are used successfully for a variety of operations, particularly in the area of data transfer between digital and analog computing systems, and special purpose computers. Analog to digital and digital to analog conversion units are available commercially, and their inherent characteristics are well known. Analog to digital and digital to analog conversions necessarily effect the operations of division ad multiplication respectively, and the operations of addition and subtraction can be effected simultaneously therewith. Furthermore, these operations can be carried out at high speeds, inasmuch as there is no requirement of transferring numbers into and out of an arithmetic unit, as in digital computers.

The hybrid computer, being able to work in both the analog and digital domains, is particularly suited for specialized applications of data processing and system control where analog signals must be processed, and neither a digital computer nor an analog computer can alone do the job. The market for such applications, while yet small as compared to that for general purpose digital computers, is growing rapidly and is estimated to be 300 million dollars for 1969. However, two basic and primary factors continue to constrain this growth. First, in those applications where the hybrid converter is utilized as a link to a digital computer, the required digital computer represents an expense out of proportion to the needs of the particular application for which it is used. In short, a general purpose digital computer, when utilized in a specific area such as process control, presents an excess of computing capacity. The user must thus pay not only for this excess and unused capacity, but also for the hybrid converter required to interface the digital computer to the analog-oriented system.

In the second instance, where special purpose hybrid computers are designed for specific applications, they necessarily have limited interface and computational flexibility. Being designed for a specific application, such a hybrid computer lacks the flexibility of a general purpose digital computer. Once designed, its capability can be expanded only marginally by software. Equally importantly, it is produced only in limited quantities, and is consequently relatively expensive. Thus, the present art provides essentially a choice between a digital computer system augmented by a hybrid converter to attain analog interface capability, and a special purpose hybrid computer system which lacks the program flexibility of the digital computer. There remains a need for an inexpensive hybrid computer, capable of interfacing with analog and/or digital oriented systems, which can be programmed for a wide variety of applications.

SUMMARY OF THE INVENTION

It is an object of this invention to provide a programmable, sequential-step electronic computer having the capability of interfacing with an analog or digital-oriented system.

It is another object of this invention to provide an inexpensive, efficient hybrid computer capable of on-line processing of data generated by analog-oriented systems.

It is another object of this invention to provide a high-speed, easily programmable multipurpose computer.

It is a further object of this invention to provide a hybrid computer capable of signal processing and converting, for use in a control system or data processing system employing a general purpose digital computer.

It is yet a further object of this invention to provide a programmable hybrid computer capable of simulating analog systems.

Accordingly, the hybrid computer of this invention utilizes as the basic means of performing mathematical operations a hybrid computing element, having a conventional operational amplifier and comparator amplifier, and making common use of a digital register, current switches, and a summing resistor network. Summing amplifiers, holding amplifiers and other special analog and digital devices, with accompanying logic circuitry, are added to supplement the operation of the hybrid computing element. Input signals are selected from a plurality of external sources, and coupled directly to the hybrid computing element by an input multiplexer, and similarly, processed signals are directly coupled to any of a plurality of external terminals through an output distributor. A programmable memory system, operating through registers and decoding logic, sequences the HCE serially through program steps, addresses the input multiplexer to couple the corresponding input signals to the HCE, and addresses the output distributor to couple the computer and processes signals to the appropriate output terminals. The memory system and its associated sequence logic control the hybrid computing element on a step-by-step basis, giving the system the program flexibility of a general purpose computer. The signal processing flow, i.e., the input signal flow to the hybrid computing element through the input multiplexer, and the output signal flow from the hybrid computing element through the output distributor, is also controlled a step-by-step basis. The overall system thus combines the flexibility of the general purpose computer with the signal interface capability of an analog computing system.

DESCRIPTION OF THE PREFERRED EMBODIMENTS

Figure 1:
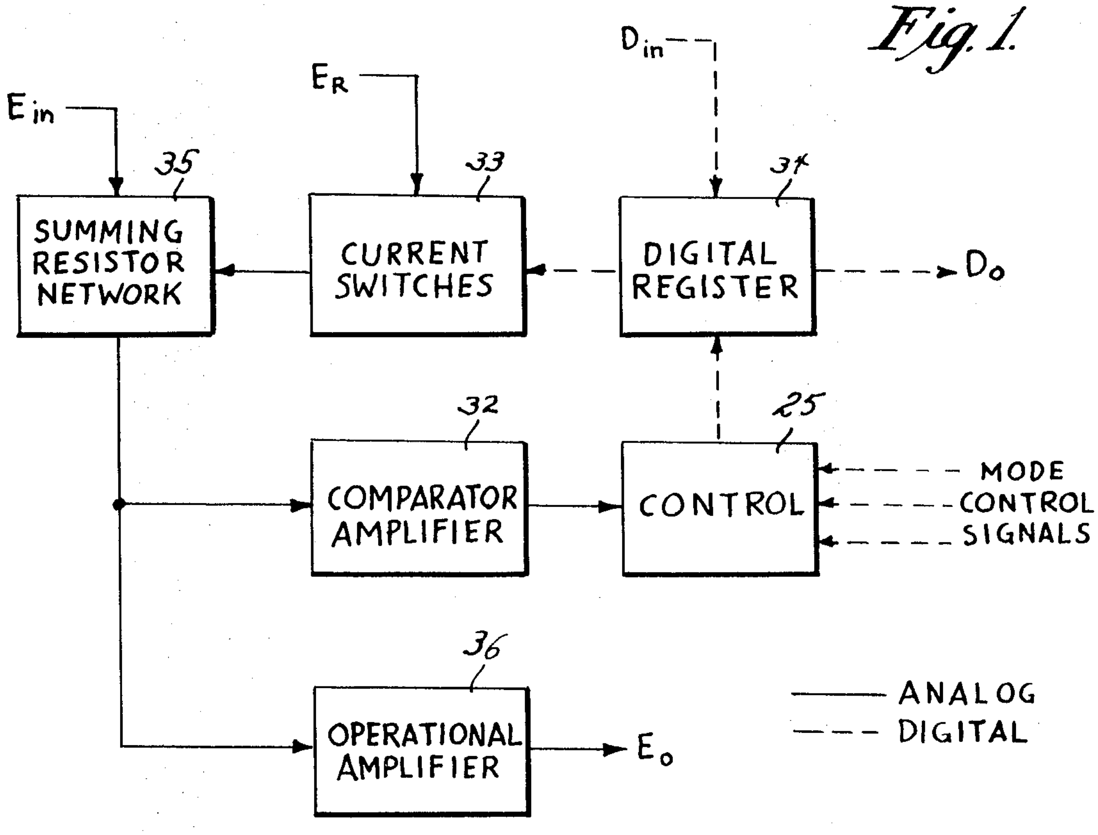
FIG. 1 shows a block diagram of the components of the hybrid computing element.
Figure 2A:
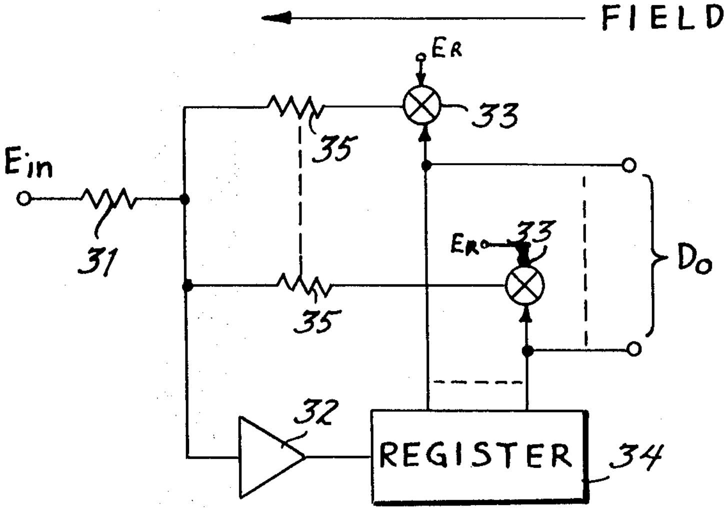
FIG. 2A shows a schematic diagram of an A to D converter.
Figure 2B:
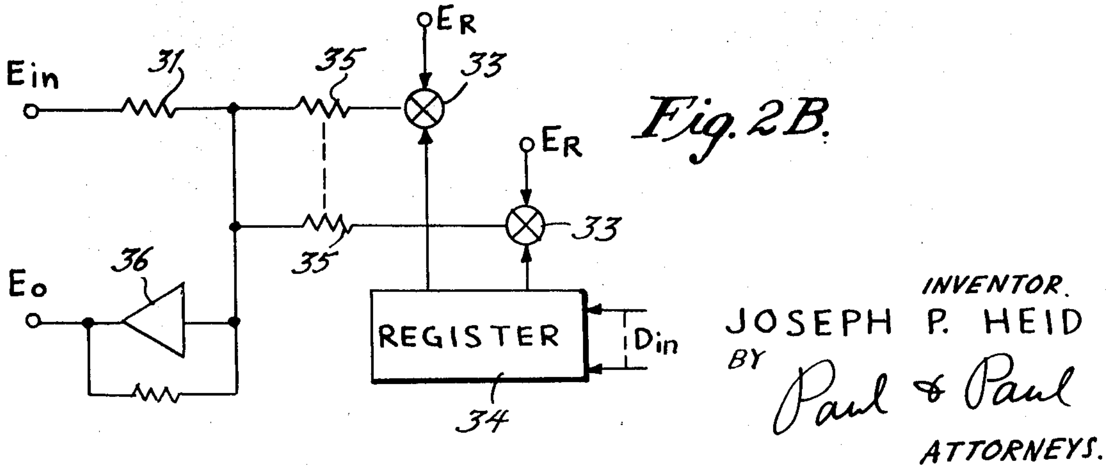
FIG. 2B shows a schematic diagram of a D to A converter.
Figure 3:
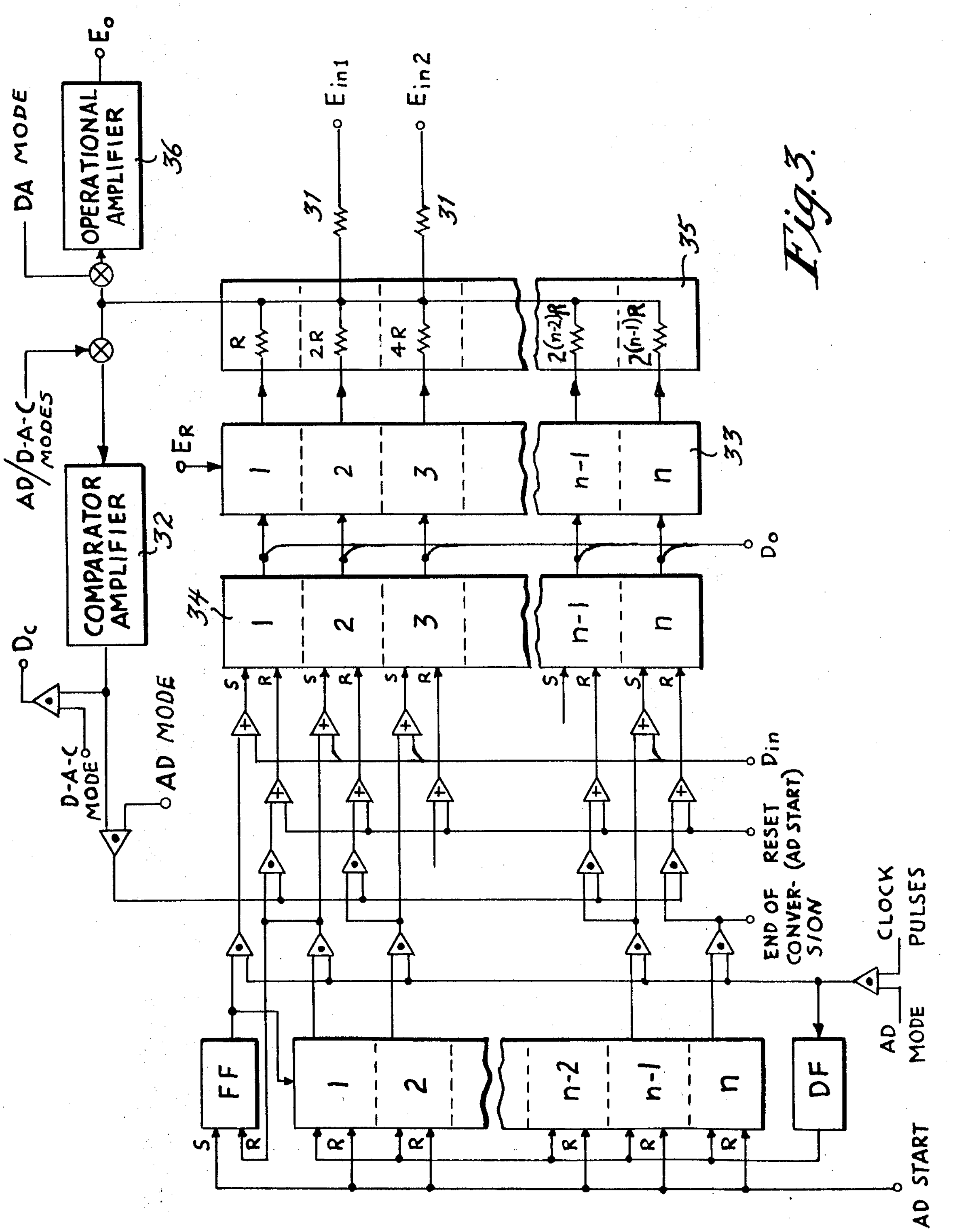
FIG. 3 shows a block diagram representation of the combined elements of the hybrid computing element as well as the control logic for same.

Referring to FIG. 1, the components of the hybrid computing element (hereafter referred to as the HCE) are shown in relation to each other, A more complete understanding of such components is obtained by reference to FIGS. 2A, 2B and 3. FIG. 2A shows the conventional circuitry for an analog to digital (hereinafter referred to as A-D) converter, and FIG. 2B shows a digital to analog (hereinafter referred to as D-A) converter. The circuitry of both converters is conventional and well known in the prior art.

In the A-D conversion mode, the selected $E_{in}$ analog input voltage is applied through a resistor 31 to the input terminal of the comparator amplifier 32, and the selected $E_R$ reference voltage is applied to the current switches 33. The current switches are turned on when the corresponding stage of the register 34, to which each current switch is coupled, assumes a set condition. When a current switch is on, $E_R$ is thereby coupled to a resistor 35, which in turn is coupled to the input of the comparator amplifier 32. The input to he comparator amplifier 32 thus will be a function of the number of such resistors 35 as are coupled to it by the current switches 33, and input resistor 31. The resistors 35 are binary-weighted, the smallest resistor corresponding to that stage of the register 34 corresponding to the highest binary number. Initially, all the digital register flip-flops will be in the reset, or off, state. The most significant flip-flop is first set, and the corresponding current switch 33 turned on, thereby applying $E_R$ to the most significant resistor in the summing resistor network 35. The voltage at he output of the summing resistor network will be amplified by the comparator amplifier 32. If the digital reading of the register 34 exceeds the analog quotient, $E_{in}/E_R$, comparator amplifier 32 will generate a signal which will be used to reset the most significant flip-flop. If not, that flip-flop will be allowed to remain in the set state. The control circuitry will then set the next most significant flip-flop, and repeat the above-described trial and error process for that flip-flop stage, and thereby proceed through all the stages of the conversion process. At the completion of this trial and error process, the value in the digital register 34, $D_o$, is proportional to the ratio of $E_{in}$ to $E_R$. $D_o$ has a resolution of one part in $2^n$, wherein $n$ will range normally from eight to 13 binary places. Thus, for a digital register 34 having 10 flip-flops, the resolution will be one part in 1,024.

For example, when $E_{in}$ equals 2.5 volts and $E_R$ equals 7.5 volts, $D_o$ will equal one-third of the full scale digital range of the HCE. If there are 10 digital stages in the register 34, the digital value of $D_o$ will equal 341 units. In binary form, this value would be 0101010101. Similarly, when $E_{in}$ and $E_R$ both are equal to the same analog voltage, such that their ratio is 1, $D_{out}$ will equal the full scale value of 1,023 units.

In D-A conversion, e.g., multiplication, the selected $E_R$ reference voltage is applied to the current switches and the selected $D_{in}$ value is stored in the digital register 34. The control circuitry, set to the D-A mode, applies the binary value in the $n$ flip-flops of the digital register 34 to the corresponding current switches, thereby connecting the $E_R$ voltage to the corresponding binary-weighted resistors 35 in the summing resistor network. The signal at the output of the summing resistor network is amplified by the operational amplifier 36, thereby producing an output voltage $E_{out}$ which is proportional to the product of $D_{in}$ and $E_R$. For example, for a 10-stage digital register, when $E_R$ equals 8 volts and $D_{in}$ has a binary value equivalent to 256 units, $D_{in}$ times K equals one-fourth, and the corresponding $E_o$ signal equals 2 volts. Similarly, if $D_{in}$ equaled the full scale digital range of 1,023 units, $E_{out}$ would equal $E_R$.

Still referring to FIG. 2B, it is seen that addition or subtraction can be accomplished simultaneously with D-A multiplication by the introduction of an $E_{in}$ analog voltage through resistor 31. The output of operational amplifier 36 is proportional to the sum of the product $D_{in}$ times $E_R$, plus or minus $E_{in}$. By making $E_{in}$ a plus or minus polarity, addition or subtraction respectively can be achieved. This operational step is called D-A multiplication and summation, and is hereinafter referred to as D-A-S.

Referring now to FIG. 3, we see the detailed circuitry of the HCE, and the manner in which the operational amplifier 36 and comparator amplifier 32 are coupled so as to make each available for a plurality of operations. FIG. 3 shows the manner in which a digital register 34, the current switches 33, and the summing resistors 35 are used commonly for performing the four basic mathematical operations of the HCE. During an A-D divide operation, an A-D mode signal, generated by control elements hereinafter described, and an A-D start signal cause the control logic circuitry as shown in FIG. 3 to process the digital register 34 through the aforementioned steps. Further, comparator amplifier 32 is switched into the circuit, while operational amplifier 36, in the absence of a D-A mode signal, is isolated from the circuit. Conversely, during a D-A multiply operation, the comparator amplifier is isolated from the circuit, and the operational amplifier is switched into the circuit. Similarly, the operational amplifier 36 is used for conventional add and subtract operations by isolating the comparator amplifier, clearing the register 34, and coupling the analog inputs through a plurality of resistors 31. These will hereinafter be referred to as the A and S operations.

The configuration of the HCE as shown affords an economy because of the multiple use of components. Thus, the same summing resistor network 35, current switches 33 and digital register 34 are used in both D-A multiply and A-D divide operations. The operational amplifier 36 is used in both D-A multiply, D-A-S, and add and subtract operations.

Figure 4:
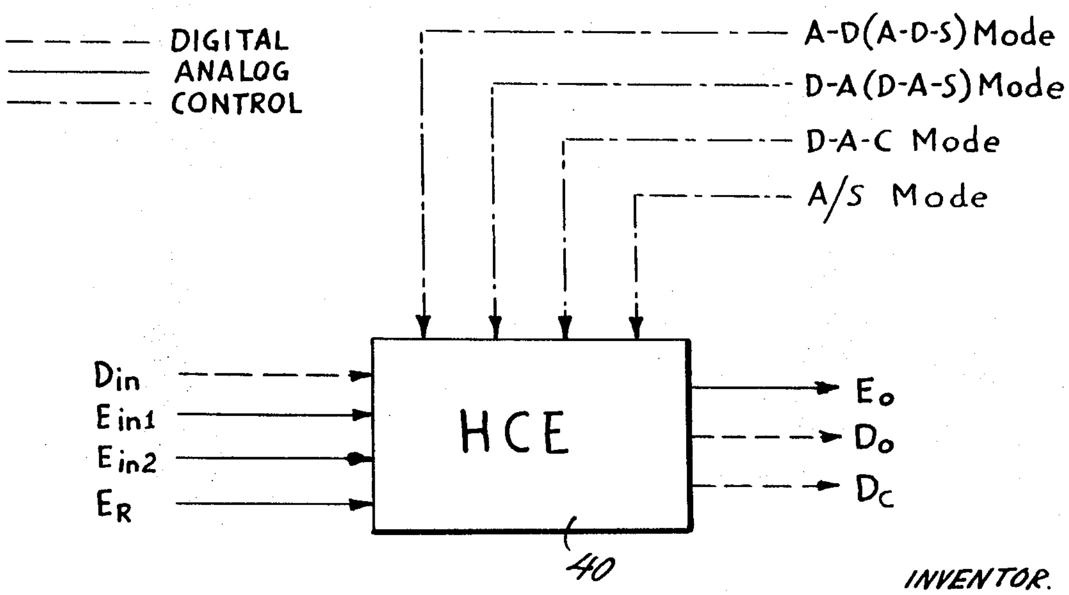
FIG. 4 is a schematic representation of the inputs, outputs and control signals of the hybrid computing element.

Referring now to FIG. 4, the operational capacity of the HCE, and the applicable inputs and outputs, are shown. It is to be noted that in any operation involving division or multiplication, there is a reference voltage signal, $E_R$, as was illustrated in FIGS. 2A, 2B and 3. For purposes of clarity, whenever the A-D mode is involved, $E_R$ will be referred to as $E_{R(d)}$, and when the D-A mode is utilized, $E_R$ will be referred to as $E_{R(m)}$. Further in the subsequent discussion, whenever the full scale value of $E_R$ is to be used, it will be referred to as $E_{FS}$.

When in the A-D mode, the HCE receives two analog inputs, $E_{in}$ and $E_{R(d)}$. The output, being in digital form, is proportional to $E_{in}$ divided by $E_{R(d)}$. Alternately, in the D-A mode, one of the inputs, $D_{in}$, is a digital input which is stored in the register 34, the output voltage, $E_o$, being proportional to the product of $D_{in}$ times $E_{R(m)}$.

Still referring to FIG. 4, the various modes of the HCE are shown. The A-D, D-A, A, S, and D-A-S modes have already been discussed. Alternately, addition and subtraction is accomplished simultaneously with the A-D division operation by coupling a plurality of input voltages $E_{in}$ through a plurality of resistors 31 to the input of comparator amplifier 32. In this operation, hereinafter referred to as A-D-S, the quotient $D_o$ is the ratio of the sum of the $E_{in}$ voltages to the $E_R$ reference voltage. Also noted on FIG. 4 is a D-A-C operation which is explained below. It is thus seen that the HCE is capable of performing the four basic mathematical operations as well as three additional combination operations. Further, the speed with which it performs such operations is competitive with the operating times of general purpose digital computers. This is because the analog voltages are coupled directly into the HCE, and need not be shifted out of memory and into another register prior to the mathematical operations, as is the general technique with general purpose digital computers.

The D-A-C operation referred to above represents a combination digital-to-analog multiply and compare operation, and represents an additional basic capability of the HCE. In this operation, a digital input $D_{in}$, an analog input $E_{in}$, and a reference voltage $E_R$ are applied. However, unlike the D-A operation, the comparator amplifier 32 is coupled into the circuit by a D-A-C mode signal, i.e., it is coupled to the junction of the summing resistor network 35. The output of the comparator amplifier is not coupled back into the HCE control circuitry as in the A-D mode. The comparator amplifier senses whether the $D_{in} \times E_R$ product, or $E_{in}$, is greater, and produces a signal at its output terminal, $D_c$, which indicates the result of the comparison. Thus, in one step, a digital signal is multiplied by an analog signal, and compared with a second analog signal. This very useful D-A-C operation can be utilized, for example, in the process of limit checking. In executing such a process, the HCE is placed in the D-A-C mode, with the difference between $D_{in} \times E_{FS}$, and $E_{in}$, being presented to comparator amplifier 32. Upper and lower limit values for a plurality of channels are stored in memory, as is described hereafter, with the system, under program control, checking each channel on a periodic basis. It is also evident that the D-A-C compare operation is very useful in any iterative procedure where the computer must check periodically to see if it has carried a calculation to within a tolerable degree of error.

The operations of the HCE are summarized in the following table:

HCE OPERATIONS

| Operation mode | Inputs | | | | Outputs | | |
|---|---|---|---|---|---|---|---|
| | $E_{in_1}$ | $E_{in_2}$ | $E_R$ | $D_{in}$ | $E_0$ | $D_{out}$ | $D_c$ |
| A-D | X | | X | | | X | |
| A-D-S | X | X [1] | X | | | X [1] | |
| D-A | | | X | X | X | | |
| D-A-S | X | | X | X [2] | X | | |
| D-A-C | X | | X | X [2] | | | X |
| A | X | X | | | X | | |
| S | X | X | | | X | | |

[1] In the A-D-S mode, $E_{in_2}$ may be selected by a preceding program instruction, in which case the instruction designates a channel for $D_{out}$ or, alternately, the instruction word may designate the channel for $E_{in_2}$, with the output remaining in the digital register.

[2] $D_{in}$ placed in register 34 by a preceding instruction.

The functions performed by the hybrid computing system when in the various modes are summarized in the following table:

| Mode | HCE Functions |
|---|---|
| A-D | $D_0=K\frac{E_{in}}{E_{R(d)}}$ |
| A-D-S | $D_0=K\frac{(E_{in_1}\pm E_{in_2})}{E_{R(d)}}$ |
| D-A | $E_0=\frac{D_{in}\times E_{R(m)}}{K}$ |
| D-A-S | $E_0=\left(\frac{D_{in}\times E_R}{K}\right)\pm E_{in}$ |
| D-A-C | for $D_{in}\times E_R\geqq E_{in}$, $D_c$ is binary one.<br>for $D_{in}\times E_R< E_{in}$, $D_c$ is binary zero. |
| A | $E_0=E_{in_1}+E_{in_2}$ |
| S | $E_0=E_{in_1}-E_{in_2}$ |

K, as used above, is a constant, equivalent to the full scale digital range of the register 34.

Figure 5:
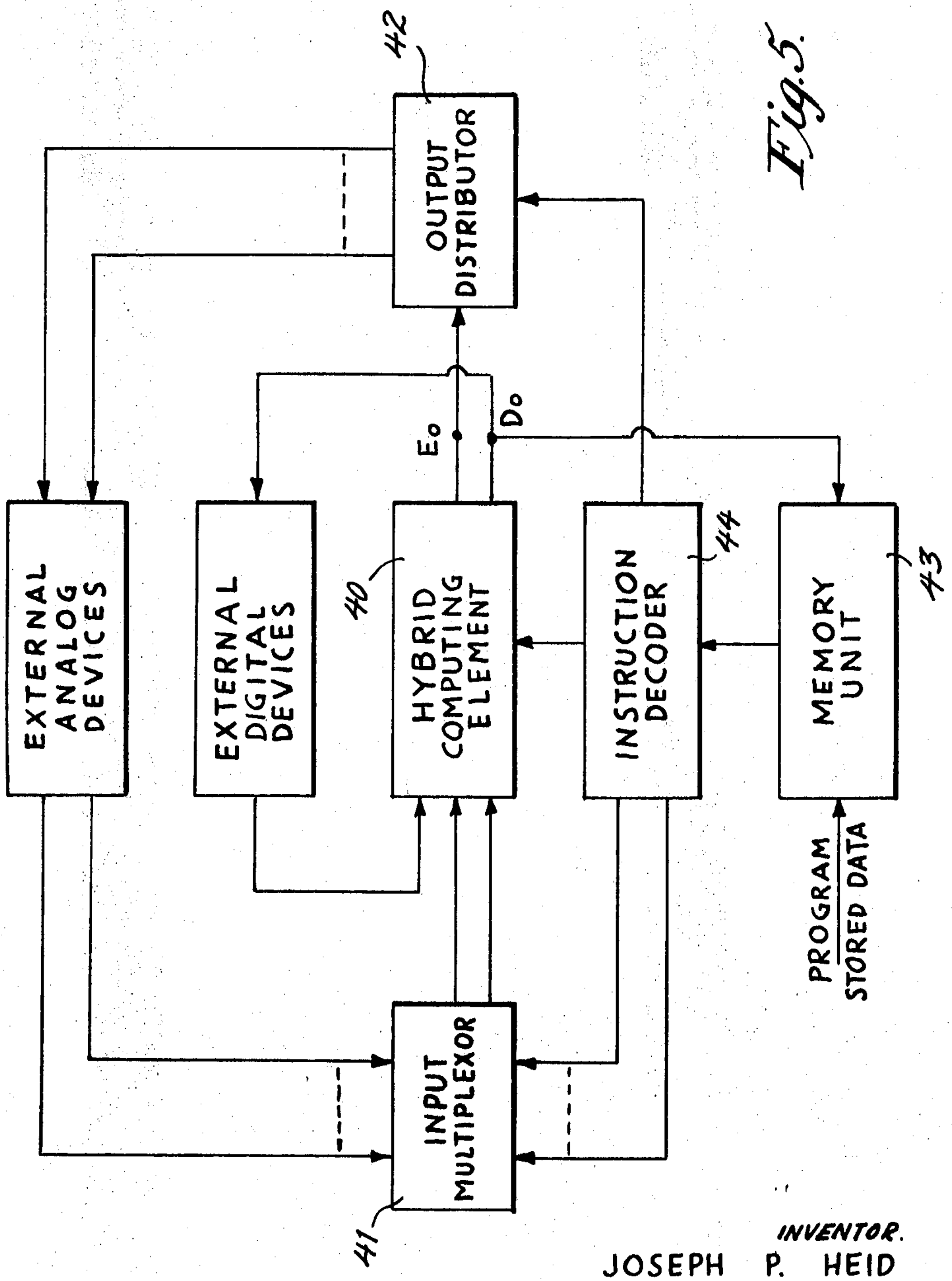
FIG. 5 is a block diagram of the overall hybrid computing system.

FIG. 5 presents a block diagram of the overall hybrid computing system, showing the integration of the HCE with the input multiplexer 41 and the output distributor 42, as well as the manner in which the memory unit 43 and instruction decoder 44 control the signal flow from input through the HCE to output. The input multiplexer 41 is a conventional circuit whereby any one of a plurality of input signals can be gated to the HCE. The output distributor 42 gates the analog output of the HCE to any one of a plurality of output terminals, and holds it there until it is removed or replaced by a subsequent operation. The output distributor, then, permits direct gating of an analog signal to an external circuit, or storage within the hybrid computing system for subsequent use. The input multiplexer and output distributor thus provide the hybrid computing system with the capability of interfacing with analog data systems. The input and output of digital data through register 34 provide an interface capability with external digital devices.

In the preferred embodiment, the memory unit 43 is comprised of conventional core memory. In operation, the program is fed into the memory by conventional input equipment, it being anticipated that a paper tape reader would be preferable for use with this invention. However, any compatible input equipment may be used. Although the memory may be of any commercial form, for purposes of this discussion it is assumed that it is core memory, with both read-in and readout capability. In addition to the basic program, subroutines will also be stored in memory at designated locations, it being anticipated that up to 16 such subroutines, of 10 instruction words per subroutine, will be utilized. However, the number of such subroutines which can be developed is unlimited, although the number which can be fed into memory for any given operation will, of course, be limited by the size of the memory. Typically, a memory of approximately 1,000 words will be utilized, in which event 840 words would be left for the remainder of the program and for storage of data as needed.

Figure 6:
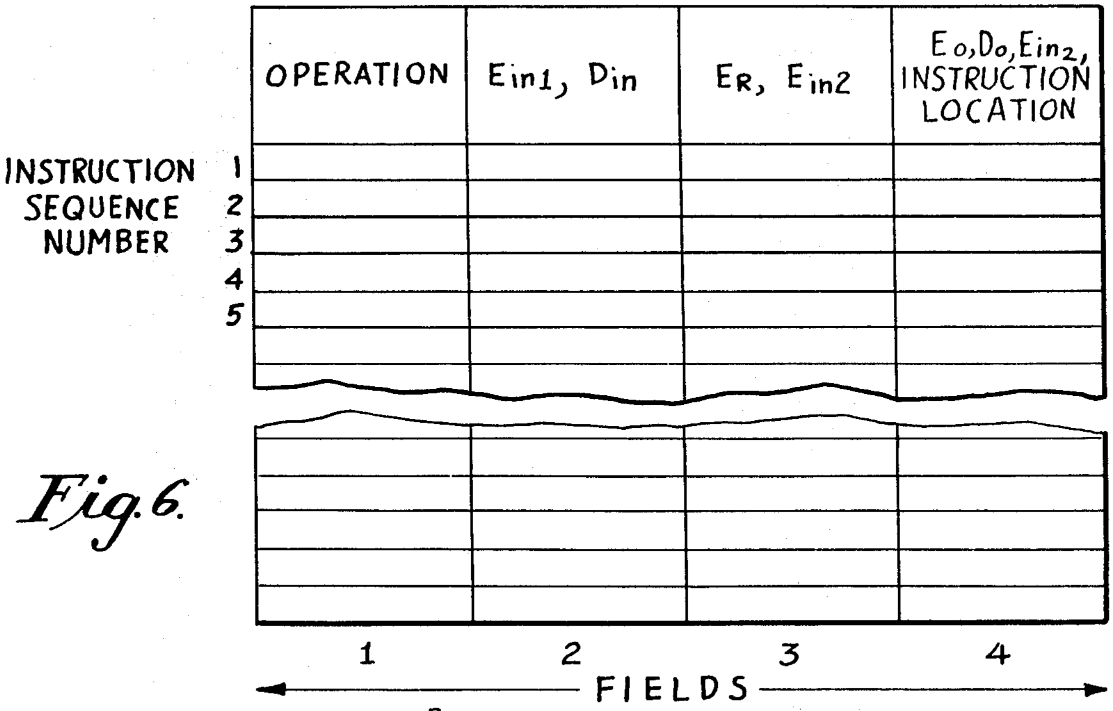
FIG. 6 is a representation of the instruction word format.

FIG. 6 shows a preferred instruction word format which is utilized in this invention. Each instruction is comprised of four fields, an operation field and three address fields. Each field carries six binary bits of information. However, this figure, as well as the number of fields, is variable and the determination of the number of bits in each field will be based upon trade-off considerations between hardware and software. Each operation is represented by a number which designates the number code of the particular operation. Generally, two of the address fields are utilized to designate the addresses of input operands. The third address field generally designates the output address. For example, if the instruction is that of division, the operation field contains a binary coded number which establishes the proper logic circuitry. The first and second address fields designate analog inputs which are to be divided, in which case the addresses would control the input multiplexer channels from which the analog voltages are obtained. Correspondingly, in a multiplication operation, one of these addresses could designate a digital input, the address designating either a specific input device which is coupled to the HCE digital input terminal, or the digital information already residing in the HCE register. In the D-A-S mode, that address (field 2) is used to select an analog signal to be added or subtracted. The output channel is determined by the fourth address field, whereby the output distributor provides coupling to the designated analog output channel, or controls an appropriate output digital device if a digital output is involved. In the A and S operations, fields 2 and 3 designate signals to be added or subtracted. In the A-D-S operation, field 4 can be used to designate the signal to be added, the resultant remaining in the register to be utilized by the next operation. Field 4 can also be used to designate an instruction location in an operation which calls for program branching to a specified instruction location. The word format, containing as it does, three address fields, illustrates the ease and power of programming the system of this invention. Being able to select three addresses simultaneously, fewer instructions are needed in order to carry out a particular mathematical routine.

Figure 7:
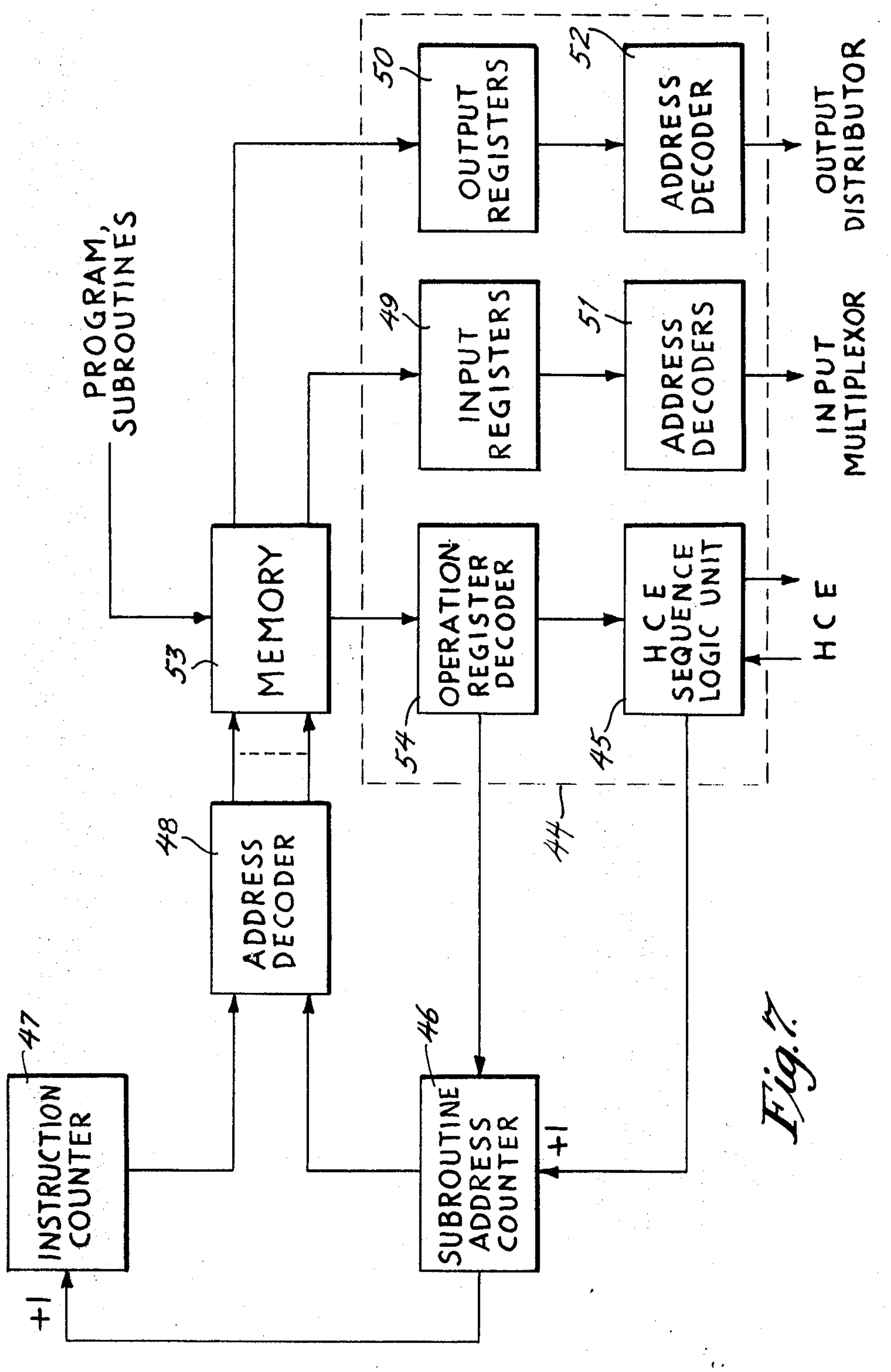
FIG. 7 is a block diagram representation of the memory and program control elements of the system, in the preferred embodiment using core memory.

As noted above, the preferred embodiment of this invention utilizes a conventional core memory as the main programming element. The manner of sequencing the program which is fed into such core memory is illustrated in the block diagram of FIG. 7. In operation, when a program is initiated, the first instruction word is read out 3 memory 53. Such readout involves a parallel readout from memory into the operation register decoder 54, which register assumes a binary code according to the operation indicated by field 1 of the instruction. If a single instruction is involved, the operation register decoder 54 binary output is coupled through to the HCE sequence logic unit 45, which in turn generates the proper logic control signals to operate the HCE. The sequence logic unit 45 is comprised of conventional logic gates which operate upon clock pulses to determine the control signals for each operation. Simultaneously, the address information from fields 2 and 3 is coupled through to register 49 and address decoder 51, and thence to the input multiplexer 41. Similarly, the address information from field 4 is coupled to register 50, the binary setting of which is decoded by address decoder 52 and transmitted therefrom to the output distributor 42.

If a subroutine is involved, field 1 of the instruction causes the operation register decoder 54 to transmit a signal to preset the subroutine address counter 46 to the address corresponding to the subroutine start location. The setting of the subroutine address counter in turn operates address decoder 48, which in turn gates out of memory the first instruction of the corresponding subroutine. The information from said first instruction is transmitted through operation register decoder 54 to the HCE sequence logic and to the input and output registers 49 and 50 in the same manner as any other instruction from memory. After said first instruction is completed, an "end of instruction" signal returning from the HCE 40 is transmitted back through the sequence logic unit 45 to the subroutine address counter 46, advancing it one step. The contents of subroutine address counter 46 are decoded by address decoder 48, which gates out of memory the next instruction in the subroutine. Upon conclusion of the subroutine, counter 46 steps instruction counter 47 by one, the binary setting of which is interpreted by the address decoder 48, which gates out of memory 53 the next instruction step in the program which follows the conclusion of the subroutine.

In the preferred embodiment as described hereinabove, the registers and counters referred to are standard electronic registers, comprised of binary (flip-flop) circuits coupled to perform the designated functions. Thus, operation register decoder 54, registers 49 and 50, subroutine address counter 46, and instruction counter 47 are conventional binary-type circuits. Similarly, the address decoders 48, 51 and 52 and HCE sequence logic unit 45 are standard logic circuits.

A partial list of some of the subroutines which have been devised for use with this invention includes the mathematical operations of calculating the square of a number, cube, square root, arctan, sine, cosine, exponential limited thereby, Cartesian to Polar coordinate conversion, Polar to Cartesian, differentiation, integration and function generation. This list is merely representative, there being no limit upon the number of subroutines which can be devised for use with this invention.

In order to illustrate the manner in which the program steps control the input multiplexer and the output distributor, and the manner in which the system is programmed to use subroutines, the following illustrative program for converting X and Y Cartesian coordinates into R and $\theta$ Polar coordinates is presented:

| | Program | | | | |
|---|---|---|---|---|---|
| Step No. | Operation (Field 1) | $E_{in_1}$ (Field 2) | $E_{in_2}$ (Field 3) | $E_R$ (Field 3) | E (Field 4) |
| 1 | 4 (square) | 96 (X) | | | 123 ($X^2$) |
| 2 | do. | 97 (Y) | | | 122 ($Y^2$) |
| 3 | 9 (square root) | 98 ($X^2$) | 95 ($Y^2$) | | 124 (R) |
| 4 | 15 (arctan) | 97 (Y) | | 96 (X) | 125 ($\theta$) |
| 5 | 2 (if) | 99 (R) | | 86 (pot) | 1 |
| 6 | 8 (go to) | | | | 185 |

Figure 8A:
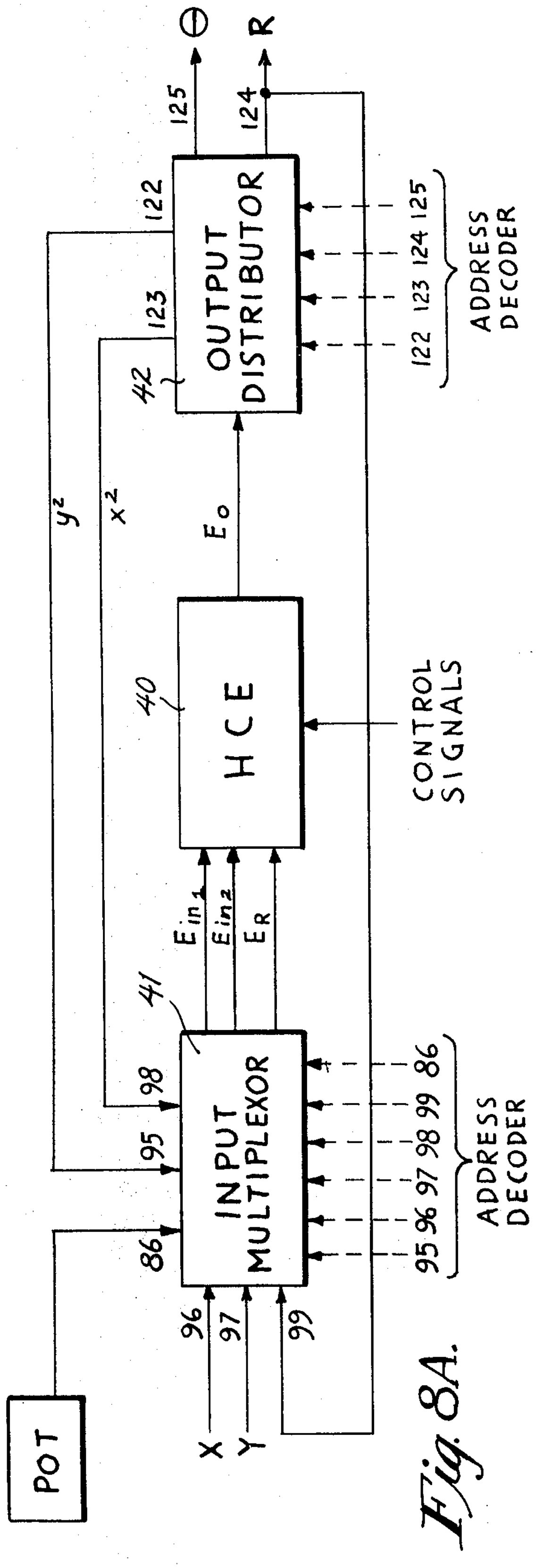
FIG. 8A is a diagrammatic representation of the input-output channel selection utilized in the routine for effecting Cartesian to Polar coordinate conversion.

In the above program, the numbers under the four fields represent coded operations and multiplexer-distributor channels. Instructions 1 and 2 square the analog operands X and Y respectively. As seen in FIG. 8A, which illustrates the input-output connections, the input multiplexer 41 is addressed to route the signal on channel 96, carrying the value of X, into the HCE. Similarly, in step 2, the input multiplexer addresses channel 97 to route Y into the HEC. Each of these steps calls for the performance of a subroutine, that of squaring an operand. Correspondingly, with the appropriate input channel selected, the program carries through the subroutine operation of squaring X and holding the squared value at channel 123, and proceeds to step No. 2, squares Y, and holds same at channel 122. At the end of the Y squared subroutine, the system proceeds to step No. 3, which calls for a square root subroutine. Step 3 utilizes output distributor channels 122 and 123 which are coupled to input multiplexer channels 95 and 98, thereby providing X squared and Y squared as inputs to the HCE. Upon completion of the square root subroutine, the program steps to step No. 4, a subroutine for obtaining the arctan, resulting in a compound value of $\theta$ which is provided at output channel 125. Instruction 5 tests to see if the value of R, as computed in step 3 and held at channel 124 by a holding amplifier, exceeds some predetermined analog value as is introduced by a potentiometer setting coupled to channel 86. If not, instructions 1 through 4 are re-executed. If R exceeds the given value, the computer proceeds to instruction 6 which, when executed, branches to another part of the program starting at the location designated in field 4 (185 in this example).

Figure 8B:
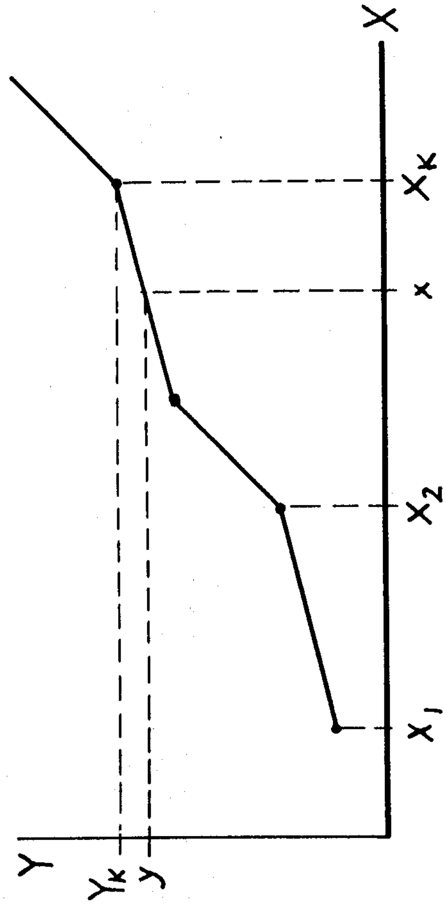
FIG. 8B is a graph of a nonlinear function represented by multiple straight line segments.

An illustration of a simple four step subrountine is shown below, whereby the hybrid computing system performs the useful operation of function generation. With this subroutine, a given time-varying analog voltage is monitored, and a continuous output signal, dependent upon the monitored signal, is calculated. By referring to FIG. 8B, it is seen that the function is represented by a curve which is a series of straight line segments, joined at breakpoints. The subroutine below accepts an independent variable X, and calculates the dependent variable Y corresponding to the function, which is represented by data stored in memory. The breakpoints $X_k$ and $Y_k$, and the slopes between breakpoints, $Y'_k$, are stored in memory and accessed for use with this subroutine. Successive values of $X_k$ are read out of memory and checked against the input signal X, by the D-A-C operation, until the first breakpoint value $X_k$, which is greater than X, is found. Then, the system proceeds to calculate the dependent variable, Y, by calculating the function $Y_k-[Y'_k(X_k-X)]$.

FUNCTION GENERATION SUBROUTINE

| Step | Mode | $E_{in}$ | $E_R$ | $D_{in}$ | $E_0$ | $D_o$ |
|---|---|---|---|---|---|---|
| 1 | D-A-C | X | $E_{FS}$ | $X_1 \ldots X_n$ | | Advance to step 2 at $X_k>X$. |
| 2 | D-A-S | $-X$ | $E_{FS}$ | $X_k$ | $(X_k-X)$ | |
| 3 | D-A | | $(X_k-X)$ | $Y'_k$ | $Y'_k(X_k-X)$ | |
| 4 | D-A-S | $-Y'_k(X_k-X)$ | $E_{FS}$ | $Y_k$ | $Y=Y_k-[Y'_k(X_k-X)]$ | |

Figure 9:
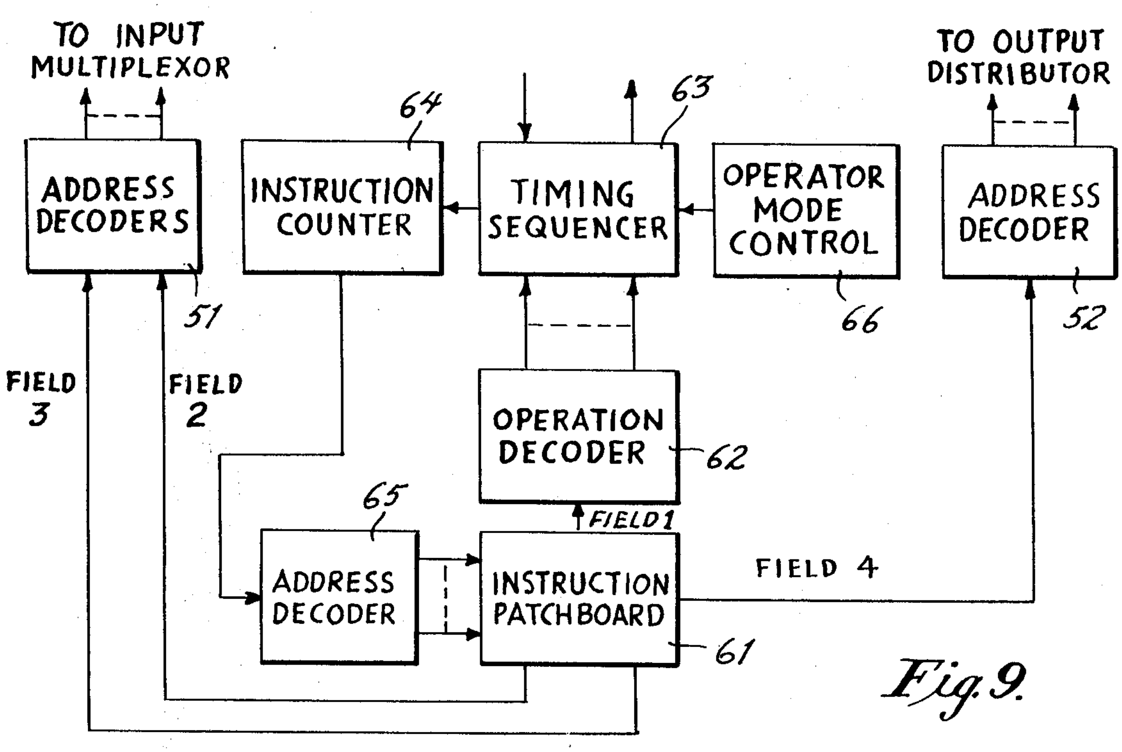
FIG. 9 is a block diagram representation of the overall system, wherein the alternate embodiment of an instruction patch board is utilized.

Referring now to FIG. 9, an alternate embodiment of the system containing an instruction patch board 61 instead of core memory is illustrated. The patch board 61 is wired to contain the sequence of instructions to be executed, each instruction containing the same fields as illustrated in FIG. 6. Such patch board and wiring is conventionally used in state of the art analog computers.

Figure 10:
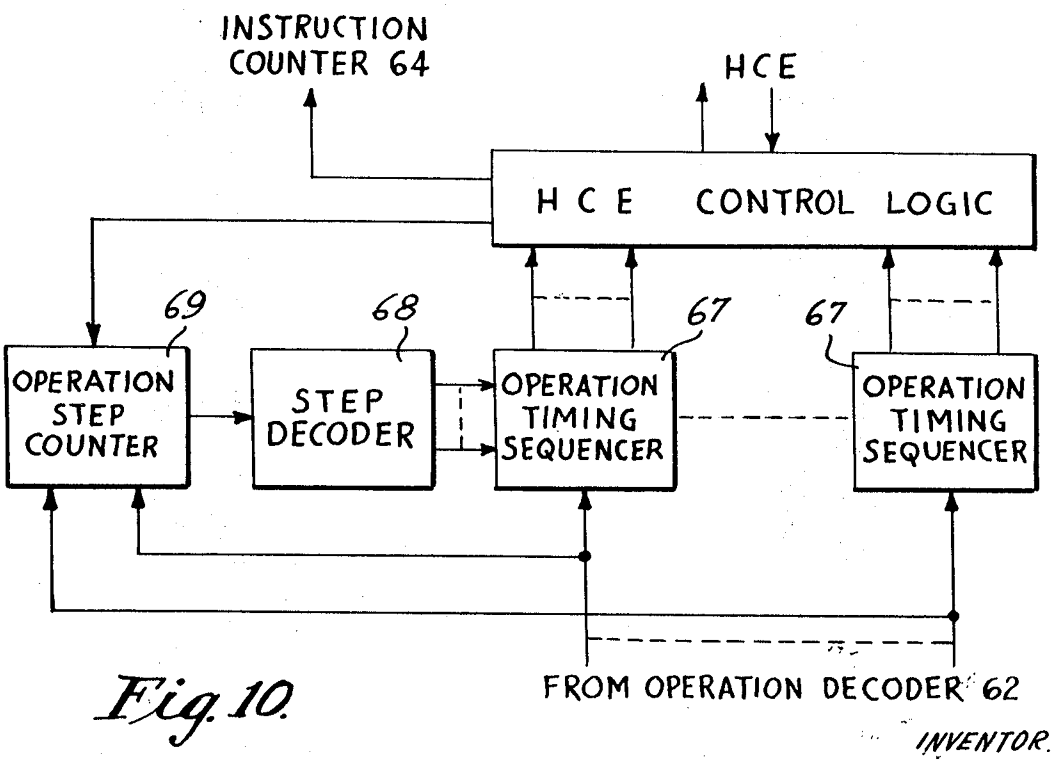
FIG. 10 is a detailed block diagram of the timing sequencer in the instruction patch board embodiment.

The contents of field 1 of the instruction word controlling the system operation are coupled to an operation decoder 62 which converts said contents, and transmits specific logic signals to timing sequencer 63. Timing sequencer 63 generates the necessary pulses that synchronize the overall system operation. A more detailed block diagram of the elements of the timing sequencer 63 is shown in FIG. 10, which is examined hereinafter.

The timing sequencer 63 generates control signals (such as the A-D mode signal or D-A mode signal), which are transmitted to the HCE to control the mathematical operation which is to be performed there. Also, the timing sequencer 63 drives an instruction counter 64, which tallies the instruction being performed and controls the sequential stepping of the operations as set forth on the patch board 61, through address decoder 65. At the completion of each instruction this counter is advanced by one to designate the next instruction to be accessed from patch board 61. In addition, an operator mode control 66 is provided, to enable the operator to take the system out of automatic operation, and to enable the operator to start or hold instruction execution, or to return the system to the reset mode.

FIG. 9 also shows parallel outputs corresponding to fields 2 and 3 going to address decoders 51. The address decoders 51 are coupled to input multiplexer 41 which couples the appropriate analog signals to the HCE. Alternately, if the D-A mode is involved, the appropriate digital input signal will be coupled into the $D_{in}$ terminal of the HCE. Similarly, the information contained in field 4 is coupled to address decoder 52 which gates the appropriate analog output channel through the output distributor 42, to receive the analog output voltage $E_o$. Alternately, the address decoder 52 selects the appropriate output digital device to receive the digital output signal.

In instances where the instruction is a simple instruction such as multiply or divide, FIG. 9 is complete in terms of showing the components required to carry out the operation. At the end of the operation, a signal is sent from the HCE back to the timing sequencer, which in turn advances the instruction counter, thereby stepping the program to the next operation. However, as in the preferred embodiment utilizing core memory, many of the desired operations will be more complex and require a subroutine of operational steps. It is therefore desirable to have built in capacity for such subroutines, thereby avoiding the necessity of programming them on the patch board 61. Accordingly, a plurality of hard-wired subroutines are provided within the timing sequencer unit 63 as shown by the operation timing sequencer 67 in FIG. 10. Typically, the system will contain up to 16 such operation timing sequencers, corresponding to the 16 subroutines which would be stored in core memory in the preferred embodiment of this invention. Referring again to FIG. 10, if field 1 of a given instruction word designates a hard-wired subroutine, the operation decoder 62 activates the appropriate operation-timing sequencer 67. The gates of the operation decoder 62 permit signals to be transmitted through to the appropriate timing sequencer. This sequencer in turn gates the appropriate logic circuitry to transmit control pulses and signals to the HCE and special analog and digital devices in order to carry out the first step of the hard-wired subroutine. When said first step is completed, a "complete" pulse is returned from the HCE, causing an operation step counter 69 to be advanced by 1. The binary information of said operation step counter 69 is transmitted through a step decoder 68 which advances the selected operation timing sequencer 67 to the next operation. The appropriate logic signals are sent to the HCE for the second operation, and the sequence is repeated in this manner. Thus, the design effectively embodies an instruction patch board within a patch board. At the end of the subroutine, the operation timing sequencer 67 transmits a signal through to instruction counter 64, taking the operation out of the hard-wired subroutine and returning it to the instruction patch board 61. Although it is anticipated that approximately 16 such hard-wired subroutines will be used with the system, there is no limit to the number which may so be used. In this manner, a high degree of programmed mathematical capability is obtained.

It is to be noted that the counter and decoder elements of the patch board embodiment, as represented in FIGS. 9 and 10 and described hereinabove, are the same type of conventional electronic circuits as are described with reference to the preferred embodiment of this invention. No claim is made with respect to the specific circuitry of such element.

In the above description of the preferred and alternate embodiment of this invention, it is shown that this invention possesses many of the characteristics of both general purpose digital computers and analog computers. It is accordingly anticipated that many of the alternate embodiments and design considerations which are available in both the analog and digital fields are relevant to the subject invention. For example, the software requirements of this invention can be reduced by improvements in the hardware, and hardware requirements can correspondingly be reduced by placing heavier reliance on software.

Although this specification describes in detail the manner in which the hybrid computing system is programmed to perform a plurality of mathematical operations on a sequential-step basis, the programming techniques do not comprise any part of this invention, and accordingly none of the claims of this invention refer to programming. However, it is to be noted that the operations which have been listed and illustrated in this specification are to be referred to in defining the apparatus claimed. Further, it is to be noted that the operational capacity of the apparatus of this invention is not limited to the operations listed in this specification. Many additional instructions, e.g., shifting numbers into and out of the register 34, are utilized. It is understood that an indefinite number of programs and subroutines may be devised for use with this invention. Similarly, conventional modifications such as provision for operator control of the core memory embodiment, are within the spirit and scope of this invention.

In order to supplement the mathematical capability of the HCE, special analog and digital elements are utilized in cooperation with the HCE, e.g., holding amplifiers and potentiometers, as well as certain digital elements which perform special digital logic for operations such as output polarity determination and high-low limit comparison. The use of such elements and equivalents is within conventional practice in the computer art, and it is within the scope of this invention to incorporate such conventional art. While the invention has been described in the form of specific embodiments, it is not limited thereby, as changes may be made in the configuration of system elements, and equivalents may be substituted, without departing from the spirit and scope of the invention as claimed.

What is claimed is:

1. Hybrid computer apparatus having the capability of interfacing with external analog and digital data systems, receiving mode control signals, and performing the mathematical operations of addition, subtraction, multiplication and division, comprising:

a. a digital register, for storing digital signals, having a plurality of binary stages;

b. a current switch network, having a plurality of current switches, each connected to a respective one of said binary stages;

c. a summing resistor network, having a plurality of binary-weighted resistors, each connected to a respective one of said current switches, and having an output terminal;

d. at least one analog input resistor, connected to said output terminal;

e. a comparator amplifier, connected to said output terminal;

f. an operational amplifier, switchably connected to said output terminal; and, g. control means, for receiving said mode control signals and for controlling said apparatus to perform one of said mathematical operations according to the received mode control signal.

2. The apparatus described in claim 1 wherein said control means includes logic circuitry for controlling said apparatus to perform the mathematical operations of:

a. multiplication and summation (D-A-S);

b. summation and division (A-D-S); and c. multiplication and comparison (D-A-C), upon receiving a corresponding mode control signal.

3. The apparatus described in claim 1, having:

a. first analog input means, for connecting an analog signal to each switch of said current switch network;

b. analog output means, for connecting the output of said operational amplifier to an external analog device;

c. a digital input network, for connecting a digital input signal to said digital register; and d. a digital output network, for reading out a digital signal stored in said digital register.

4. The apparatus described in claim 3, wherein is added a. programming means, connected to said hybrid computer apparatus, for providing said mode control signals;

b. input multiplexer means, connected to and controlled by said programming means, for coupling at least one analog signal to said hybrid computer apparatus; and c. output distributor means, connected to and controlled by said programming means, for coupling said analog output means to one of a plurality of analog output channels, said programming means, input multiplexer means and output distributor means enabling said apparatus to be programmable and operate on a sequential-step basis.

5. The apparatus as described in claim 4, comprising:

a. first switching means, for connecting said output terminal to said comparator amplifier, in which state said apparatus performs said division operation;

b. second switching means, for connecting said output terminal to said operational amplifier, in which state said apparatus performs said multiplication operation; and c. compare operation logic means, connected to the output of said comparator amplifier, for providing a comparison output signal.

6. The apparatus as described in claim 4, wherein said programming means is comprised of electronic memory means being compatible with conventional electronic data processing input apparatus electronic register means coupled to said electronic memory means whereby the contents of any word contained in said memory means is decoded, logic programming means coupled to said electronic register means to generate logic signals for sequential control of said hybrid computing means, counter means and first address decoder means to sequentially step said programming means through its program, and second address decoder means to control said input multiplexer means and said output distributor means.

7. The invention as described in claim 4, wherein said programming means is comprised of an instruction patch board, operation decoder means to translate the instructions contained in said instruction patch board into corresponding electrical signals, timing sequencer means, coupled to and driven by said operation decoder means to generate control signals to control the operation of the hybrid computing means, instruction counter means and first patchboard address decoder means cooperating with said patch board to step the program contained in said instruction patch board sequentially, and second address decoder means to control said input multiplexer and said output distributor.

8. The invention as described in claim 7, wherein said timing sequencer means contains a plurality of operation timing sequencer units, each of said units containing secondary programming means whereby to step said programmable, sequential-step electronic computing system through a secondary program.

9. Hybrid computer apparatus, comprising:

a. a common computing network, having a digital register, a current switch network connected to said digital register, and a summing resistor network connected to said current switch network, and having a plurality of binary-weighted resistors;

b. an operational amplifier, switchably connected to the output of said summing resistor network;

c. a comparator amplifier, switchably connected to the output of said summing resistor network;

d. digital input means for connecting a digital input signal into said digital register;

e. analog input means, for connecting an analog signal to said current switch network;

f. said operational amplifier cooperating with said common computing network to provide digital to analog (DA) means for performing the operation of multiplication g. said comparator amplifier cooperating with said common computing network to provide analog to digital (AD) means for performing the operation of division; and, h. logic means for receiving program commands and controlling the operation of said DA means and said AD means.

10. The apparatus described in claim 9, wherein is added:

a. programming means, connected to said hybrid computer apparatus, for providing said program commands;

b. input multiplexer means, connected to and controlled by said programming means, for coupling at least one analog signal to said hybrid computer apparatus; and c. output distributor means, connected to and controlled by said programming means, for coupling said analog output means to one of a plurality of analog output channels, said programming means, input multiplexer means and output distributor means enabling said apparatus to be programmable and operate on a sequential-step basis.

11. Hybrid computing means, capable of receiving analog data signals, digital data signals, reference signals, and mode control signals, and capable of providing analog data output signals and digital data output signals, comprising:

a. a comparator amplifier;

b. an operational amplifier;

c. a summing resistor network, having a common summing junction;

d. a current switch network, coupled to said summing resistor network;

e. a digital register, coupled to said summing resistor network through said current switch network;

f. control circuitry, coupled to and driving said digital register;

g. a plurality of analog input resistors; and h. switching means, comprising, i. first switching means, to couple the input of said comparator amplifier to said common summing junction, the output of said comparator amplifier to said control circuitry, an analog data signal to one of said analog input resistors, and a reference signal to said current switch network, whereby to place said hybrid computing element in the A-D mode;

ii. second switching means, to couple the input of said comparator amplifier to said common summing junction, the output of said comparator amplifier to said control circuitry, a plurality of analog data signals to said analog input resistors, and a reference signal to said current switch network, whereby to place said hybrid computing element in the A-D-S mode;

iii. third switching means, to couple the input of said operational amplifier to said common summing junction, a digital data signal to said digital register, and a reference signal to said current switch network, whereby to place said hybrid computing element in the D-A mode;

iiii. fourth switching means, to couple the input of said operational amplifier to said common summing junction, an analog data signal to one of said analog input resistors, a digital input signal to said digital register, and a reference signal to said current switch network, whereby to place said hybrid computing element in the D-A-S mode;

iiiii. fifth switching means, to couple the input of said comparator amplifier to said common summing junction, the output of said comparator amplifier to an output terminal, a digital input signal to said digital register, a reference signal to said current switch network, and an analog signal to one of said input resistors, whereby to place said hybrid computing element in the D-A-C mode;

iiiiii. sixth switching means, to couple the input of said operational amplifier to said common summing junction, and a plurality of analog data signals to said analog input resistors, whereby to place said hybrid computing element in the A/S mode.